April 22, 1952 L. A. SCHOTT 2,593,804
TRANSMISSION
Filed July 16, 1949 3 Sheets-Sheet 1
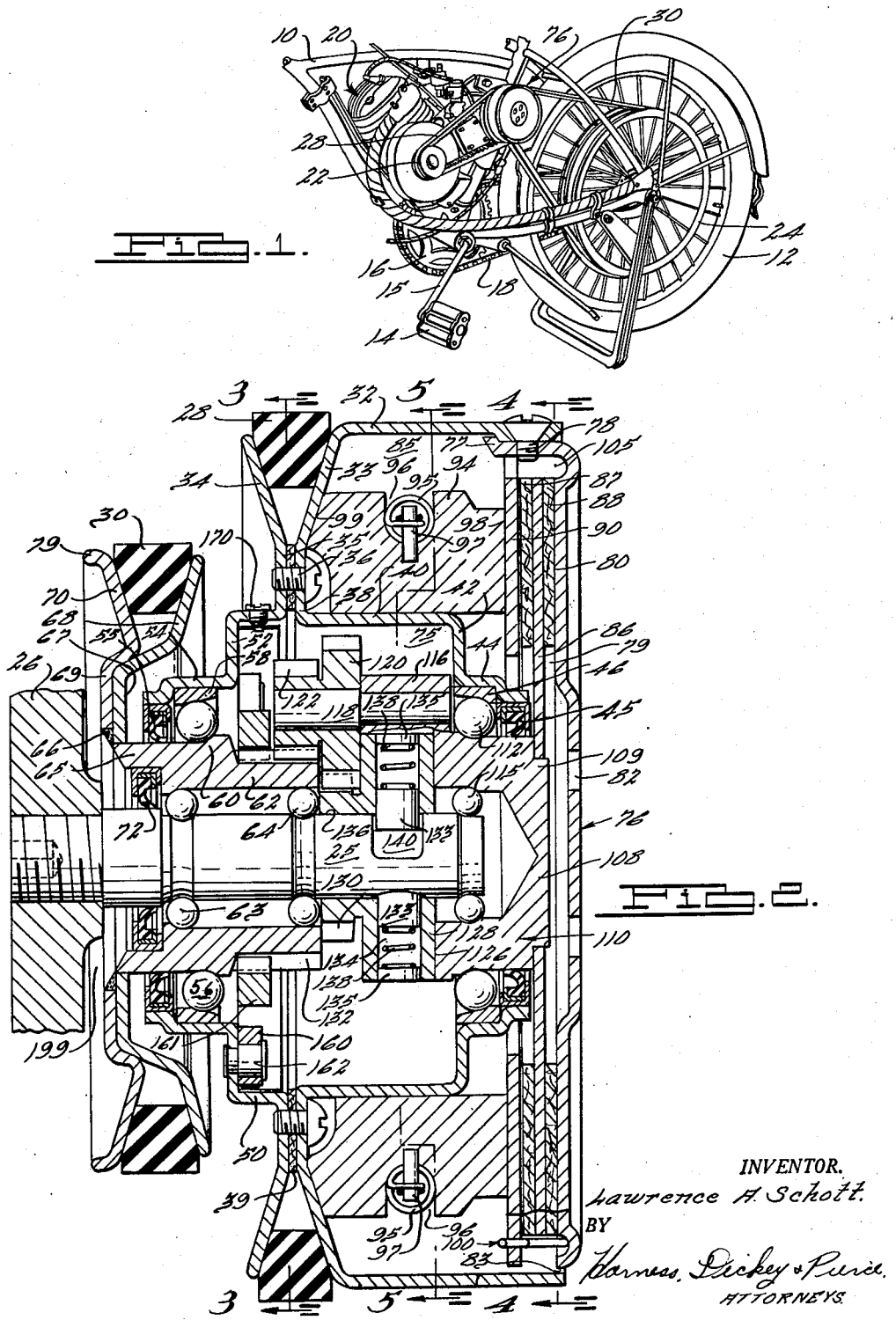
INVENTOR.
Lawrence A. Schott.
BY
Harness, Dickey & Pierce.
ATTORNEYS.

April 22, 1952 L. A. SCHOTT 2,593,804
TRANSMISSION

Filed July 16, 1949 3 Sheets-Sheet 2

INVENTOR.
Lawrence A. Schott
BY
Harness, Dickey & Pierce
ATTORNEYS.

April 22, 1952 — L. A. SCHOTT — 2,593,804
TRANSMISSION
Filed July 16, 1949 — 3 Sheets-Sheet 3
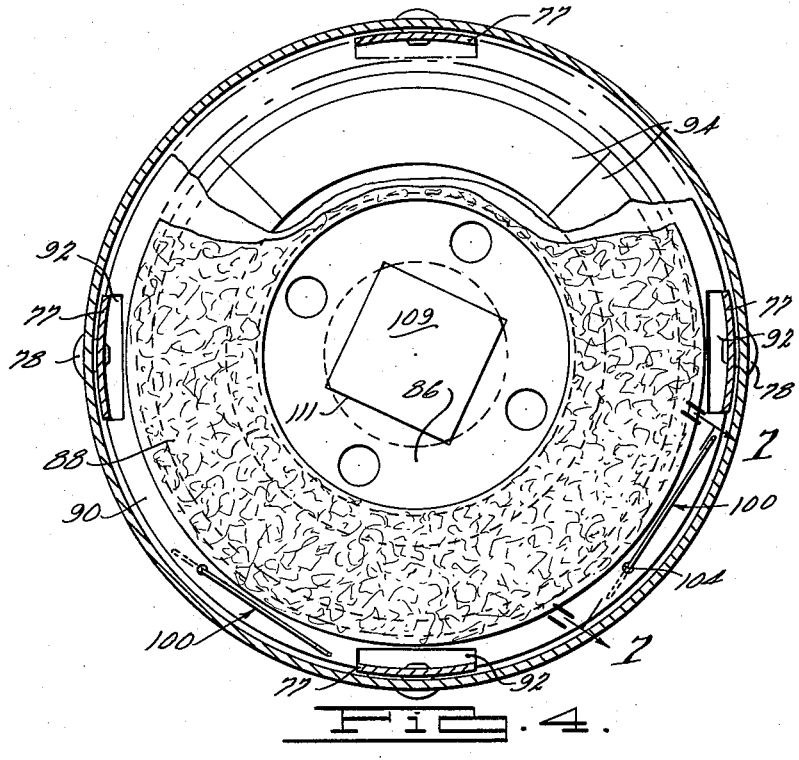
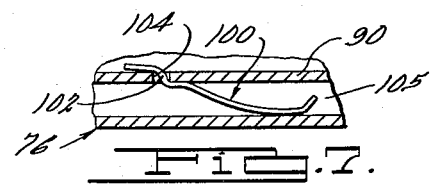
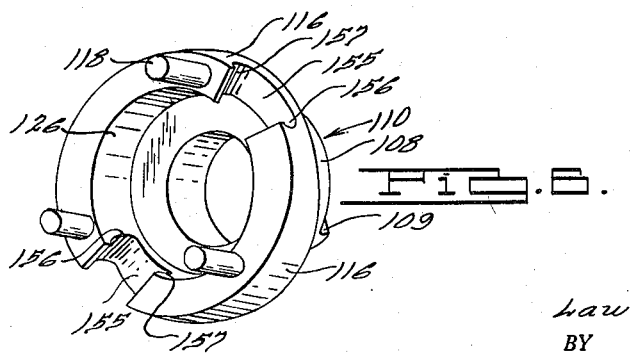
INVENTOR.
Lawrence A. Schott.
BY
Harness, Dickey & Pierce.
ATTORNEYS Patented Apr. 22, 1952

2,593,804

UNITED STATES PATENT OFFICE 2,593,804

TRANSMISSION

Lawrence A. Schott, Detroit, Mich.

Application July 16, 1949, Serial No. 105,104

29 Claims. (Cl. 192—3.6)

The present invention relates to torque-converting power transmission devices, and particularly to an improved self-shifting planetary gear transmission especially suitable for use on light motor vehicles such as motorcycles, motor bicycles, and the like, although many principles and features of the invention are not restricted to such specific uses.

It is an important object of the invention to provide such a transmission which is of extremely lightweight and compact construction, which is readily adaptable for installation on light motor-driven cycles either during original construction or as an accessory device, which effectively increases the usable torque and speed range derivable from the motor, which is self-shifting but fully controllable in its action by the driver, and which is of rugged, reliable and inexpensive construction, and easy to install, service and lubricate.

Another and more specific object is to provide an improved centrifugally-operable clutch construction.

Another object is to provide an improved transmission of the indicated character which is contained in a single, compact cylindrical casing, a great many of the parts being formed of sheet metal and adapted to be economically stamped in large-scale production.

Another object is to provide such a transmission incorporated in a casing consisting of two concentric and interfitted cylindrical compartments, the inner of which comprises a gear compartment and houses the torque-converting means, and the outer of which comprises an automatic clutch actuating compartment, such sections being substantially isolated from one another so that lubricant contained in the inner compartment cannot find its way to the outer compartment, but the elements in such two compartments being mechanically interconnected for transmission of a drive therebetween.

Still another object it to provide such a transmission wherein integral parts of the sheet metal casing assembly form coacting parts of the centrifugally operable main clutch actuating means, of the main clutch itself, of the driving and driven pulleys, and of the partition between said concentric compartments previously mentioned.

Other objects of the invention are to provide improved means for changing the driving ratio between the input and output portions of the transmission; improved means for isolating the gear section and centrifugal clutch section of the transmission; and to provide for retention of lubricant within the internally-positioned gear section without permitting escape thereof into the clutch section while nevertheless allowing ready filling, draining and checking of the lubricant in the gear section.

It is also an object to provide improved driving and driven pulley constructions for such a transmission, which pulley constructions coact to form elements of the casing structure and also coact with a part of an automatic clutch mechanism incorporated in the transmission.

Other objects and advantages will be apparent upon consideration of the present disclosure in its entirety.

In the drawings:

Figure 1 is a fragmentary perspective view showing the rear portion of a light motor-bicycle equipped with an automatic transmission incorporating the principles of the present invention;

Figure 3:
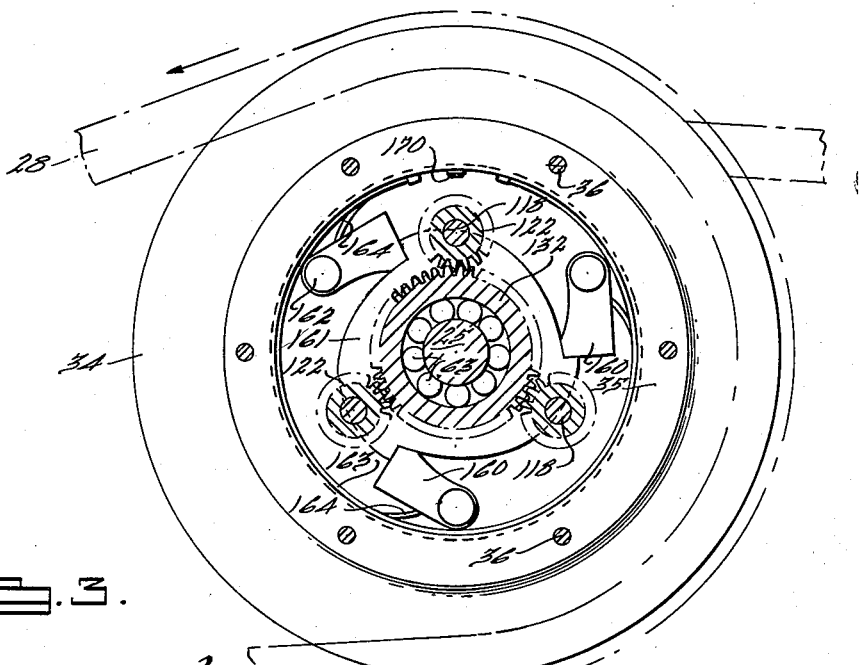
Figure 2:
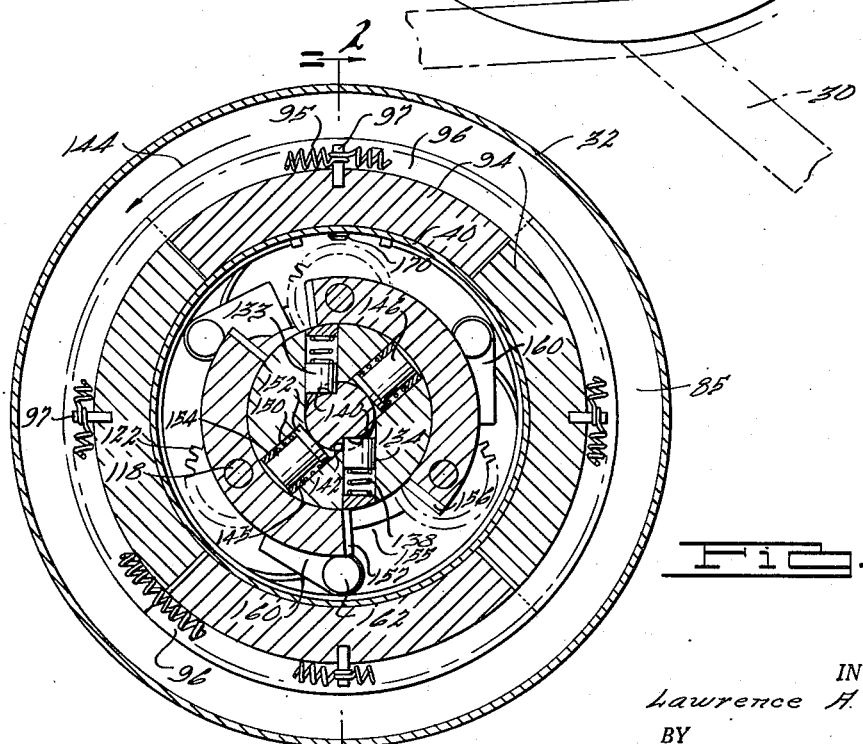
Fig. 2 is a sectional view of the transmission of Fig. 1, taken substantially on the line 2—2 of Fig. 5 and looking in the direction of the arrows.

Figs. 3, 4 and 5 are transverse sectional views, taken substantially on the lines 3—3, 4—4 and 5—5, respectively, of Fig. 2, and looking in the direction of the arrows;

Fig. 6 is a perspective view of a planetary gear carrier incorporated in the transmission; and Fig. 7 is a sectional detail taken substantially on the line 7—7 of Fig. 4 and looking in the direction of the arrows.

Referring now to the drawing, reference character 10 designates generally the frame of a cycle, which may comprise a conventional bicycle having a rear wheel 12 drivable in the usual manner from foot pedals 14, crank 15, sprocket 16, roller chain 18, and a conventional driven sprocket and coaster brake incorporated in the hub of the rear wheel but not illustrated herein. These components are well known in the art. A single cylinder gasoline engine, generally designated 20, is shown carried in the frame 10 having a driving pulley 22 from which power may be taken to drive the rear wheel 12, the rear wheel being equipped with a relatively large pulley 24 to which the power of the motor is adapted to be delivered by suitable belt means. The details of the gasoline engine form no part of my present invention and will not be considered herein. Such engines are well known in the art and, as will be recognized, it is common practice at present to connect the motor pulley 22 with the driven pulley 24 through a manually releasable clutch and a pair of V belts. With such arrangements the drive is always at the ratio fixed by the proportions of the pulleys.

By reason of the fact that gasoline engines have low torque output at low speeds, it has been very difficult to provide sufficient pulling power at low speeds with such driving arrangements having only a single fixed ratio while still providing adequate road speeds. The transmission of the present invention provides two speed ratios, which may comprise a lower speed providing higher torque for operating under heavier loads as in ascending hills, and a higher speed for ordinary traveling at higher speeds on level roads.

The transmission is contained in a single concentric housing structure of cylindrical form rotatably carried by a stationary shaft 25 fastened to and projecting from a rigid bracket portion 26 carried by the frame 10 of the cycle, the shaft being perpendicular to the plane of the frame and defining the axis of rotation of and the support for all of the transmission components. Two pulley portions are provided, one comprising an input pulley assembly drivable by an input belt 28 which extends thereto from the motor pulley 22 and the other comprising an output pulley from which an output belt 30 extends to the rear wheel pulley 24. The housing structure is formed of sheet metal and includes an outer cylindrical wall portion 32 of sheet metal formed integrally with a frusto-conic end wall portion 33 which forms one side of the input pulley. The other side of the input pulley comprises a similarly sloping or truncated conic sheet metal portion 34 having a flat annular land 35 secured as by screws 36 to a similar annular land 38 forming an inward continuation of sloping wall 33. As best shown in Figure 2, when the parts are thus secured together, the angular walls 33—34 define a V pulley adapted to receive a V-type driving belt 28.

The outer end of the cylindrical peripheral wall portion 32 is open, while at the inner periphery of the flat land 38 a further integral wall 40 of cylindrical form extends inwardly to form a re-entrant partition. Near its outer end, partition 40 is again formed inwardly to define a flat wall 42 and then outwardly to define an open-ended cylindrical collar flange 44. Flange 44 serves to support a lubricant retainer assembly 45 and a ball bearing race ring 46.

In the annular space between the outer wall 32 and the inset partition, centrifugally operable clutch mechanism is provided, while the partition 40 and its terminal portions 42, 44 coact to form a part of an internal substantially cylindrical gear case which houses the transmission components.

The pulley flange portions 34, 35, forming the left half of the driving pulley as viewed in Fig. 2, are also continued inwardly to form the left end wall of the internal or transmission section of the housing, the planar securing flange portion 35 being turned outwardly to define a relatively short cylindrical wall 50 constituting in essence an extension of the partition 40, the wall portion 50 being again formed inwardly to provide a planar end wall portion 52 and terminally, cylindrically outwardly flanged to provide a neck 54 which supports the lubricant retainer assembly 55 and the outer race 58 which is rotatably carried by bearing balls 56.

The bearing balls 56 are carried by a race portion 60 formed integrally with a combined hub and sun gear element 62 journaled as by bearing balls 63, 64 upon the shaft 25. A cylindrical extension hub flange 65 projects inwardly from the race portion 60 and is welded as indicated at 66 to the inner peripheries of a pair of dished annular stampings which form the output pulley. Such stampings have intimately nested substantially planar inner annular web portions 67, 69 and divergent outer flanges 68, 70 defining an output pulley adapted to receive the conformably tapered V-belt 30.

The lubricant retainer 55 is fitted into the end of neck 54 and bears against the cylindrical hub flange portion 65. The lubricant retainers may be of a commercially available variety or of any suitable type, the retainer 55 coacting to complete the enclosure of the inner end of the transmission compartment 75. A lubricant retainer 72 is also arranged between the inner periphery of the hub flange portion 65 and the shaft 25 to substantially seal the space between the hub and shaft.

The outer end of the pulley flange 70 may be turned inwardly, as indicated at 73, to provide oil slinging means. Thus if, after substantial wear of the inner seal 72 has occurred, oil leaks out through the hub 65, such oil will be thrown away from the belt 30.

The outer end of the housing is substantially closed by a disk-like cover generally designated 76 having a plurality of inbent tongues 77 which fit inside the periphery of the external wall portion 32, to which the cover is secured by screws 78.

An annular medial portion of the cover disk 76 is uniformly formed inwardly a relatively short distance to provide a flat annular clutch reaction face 80 upon its inner surface. It will be observed that the cover disk 76 is spaced to the right of the end of the collar flange 44 and lubricant retainer 45, as the parts are viewed in Fig. 2, and that the space between flange portions 42, 44 and the cover disk 76 defines a relatively flat circular compartment 79 within which is housed a friction disk clutch assembly, while to the left of the disk clutch compartment and surrounding the partition 40, within the annular space 85, is a centrifugal flyweight structure serving as actuating means for the disk clutch.

Ventilation of the clutch compartment is provided by air inlet holes 82 in the central portion of the cover disk 76 (which also act as spanner wrench holes) and a peripheral air outlet slot 83 between the rim of the cover and the edge of the casing 32.

The clutch structure comprises a clutch plate 86 provided with friction facings 87, 88 secured thereto upon both sides and adapted to be engaged between a pressure plate 90 which is keyed to the housing structure and the clutch face 80 formed upon the cover disk 76. In order to provide keying means between the pressure plate and the housing structure, the pressure plate is provided with peripheral notches 92 adapted to embrace opposite sides of the lug portions 77, the pressure plate being great enough in diameter to extend outwardly into the spaces between the lugs 77 so that the pressure plate is compelled to turn with the casing structure.

In the flyweight chamber 85, a plurality of segmental flyweights 94 are provided, four being shown. The flyweights are urged radially inwardly by a garter spring assembly which is preferably anchored to each flyweight and which is shown as formed of a plurality of helical tension springs 95, one for each flyweight, the springs being hooked together at their ends to form an annulus and the hooked ends being also fitted over radial anchoring pins as 97 projecting from the periphery of each flyweight near the center thereof. The spring is retained in a peripheral groove 96 formed in the several flyweight sections. One flat end face 98 of each of the flyweights is adapted to bear against the inner surface of the pressure plate 90 while the opposite faces of the several flyweights, designated 99, are inclined conformably to the sloping inner wall 33 of the housing structure.

The pressure plate is urged inwardly against the faces 98 of the flyweights by a plurality of wire springs 100, the form of which is best shown in Fig. 7. In the arrangement shown, four such springs are provided, equally spaced about the periphery of the pressure plate, each spring being provided near its pressure plate end with a portion 102 of stepped configuration, which portion projects through a hole 104 in the pressure plate. The spring-retaining holes 104 are formed in the pressure plate in alignment with a circular inwardly-facing channel 105 formed in and near the periphery of the cover disk 76 and defined by the outwardly-projecting area which surrounds the inset clutching surface 80. Each of the springs is a substantially straight wire positioned substantially tangentially, as viewed in an axial direction, as will appear from an examination of Fig. 4, and the stepped portion 102 which lies near the inner end of the wire is so angularly arranged with respect to the longer outwardly-projecting portion of the spring wire that when viewed in a radial direction, as in Fig. 7, such longer arm of the spring wire which projects into the channel 105 is maintained under a constant bowing strain by such engagement, such bowing being resisted by the engagement between the stepped portion 102 and the pressure plate, and the pressure plate being thereby urged inwardly and away from the clutch disk. These four springs also prevent rattle while the clutch weights 94 are in intermediate positions, maintaining lateral pressure on the flyweights and pressure plate at all times.

The axial travel of the pressure plate is sufficient so that when the flyweights are in their fully indrawn positions, the clutch disk is released while, when the flyweights move outwardly in response to centrifugal force, they are forced to the right, as viewed in Fig. 2, and thereby drive the pressure plate in the same direction to frictionally grip the clutch disk between the pressure plate and the face plate portion 80.

The clutch disk 86, which when clamped in the manner just described is drivable by the engine through the belt 28, is keyed at its center to the hub portion 108 of a planet carrier or drive cage structure, generally designated 110. The hub section 108 of the cage may be of square cross-section at its outer end, as shown at 109, the squared part being fitted into the conformably-shaped central aperture 111 in the clutch disk. The hub portion 108 of the cage 110 rotatably supports the collar flange 44 by means of the bearing balls 112 and projects from the transmission compartment 75 through and from the lubricant retainer 45 into the clutch compartment 79 for attachment to the clutch plate 86.

The hub portion of the cage is journaled upon the extremity of the fixed main shaft 25 as by bearing balls 115 and is provided within the transmission compartment with an enlarged body portion 116 which carries a plurality of inwardly projecting axle pins 118, three being employed in the preferred construction shown. Each pin 118 supports a pair of planet gears 120, 122, the planet gears of each such pair being integrated or formed as a unit, as shown. The inner face of the cage is provided with a concentric, cylindrical, counterbored recess 126 in which a rotor 128 is rotatably fitted. The rotor is also rotatable with respect to the shaft 25. A sun gear 130, integral with the rotor, projects from the inner face thereof and from the cage and meshes with the planet gears 120. The planet gears 122 mesh with an output sun gear 132 which is formed integrally with the hub portion 62 which, as previously noted, is fast with respect to the output pulley portions 68, 70 from which the rear wheel driving belt 30 extends to the rear wheel pulley 24.

A pair of pins 133 are provided, slidable in the rotor in substantially diametrically opposed straight cylindrical bores 134 formed in the rotor 128 in positions offset from true radial to the same angular extent and in the same angular direction, as best indicated in Fig. 5. The bores 134 are closed at their outer ends by plugs 135 and the inner ends of the bores intersect the axial hole 136 in the rotor-sun gear assembly 128, 130. Each pin 133 is urged into engagement with the shaft 25 by a helical compression spring 138 trapped between the pin and the plug 135. A plurality of notches as 140 are formed in the surface of the shaft in alignment with the orbit of the pins 133. The notches act as ratchet teeth, being wedge-shaped, as viewed in cross section (Fig. 5) and each having an abrupt wall 142 at one end which is preferably semi-circular when viewed in elevation, to provide a greater area of engagement between the notch and the pin. It will be apparent that the springs 135 tend to urge the pins 133 into the notches when these parts are aligned, and that the pins act as one-way braking pawls, to prevent the rotor from turning in a clockwise direction with respect to the shaft 25, as the parts are viewed in Fig. 5. The direction of driving rotation is counterclockwise, as indicated in Fig. 5 by the arrow 144.

Also slidable in the rotor in diametrically opposed radial holes 145 are two pins 146, each of which is slidable to project radially from the periphery of the rotor, but urged inwardly to a nonprojecting position by a relatively light helical compression spring 150 which bears inwardly against a head 152 formed at the inner end of the pin. Each spring bears outwardly against an overhanging portion of the hole 145 in which the corresponding pin 146 is slidable, such overhanging portion being defined by an inserted bushing 154.

Portions of the periphery of the cage 116 are cut away, also at two diametrically opposed positions and in alignment with the orbit of the pins 146, to define openings 155 into which the outer extremities of the pins 146 are projectable under the influence of centrifugal force when such force rises to a value sufficient to move the pins outwardly against the resistance of their springs 150. The ends of the openings 155 may be rounded for better engagement with the sides of the pins 146, as indicated at 156 and 157 in Fig. 6. Pins 146 thus act as centrifugal clutching means to lock-up the planet system, by keying the sun gear 130 to the cage 116 when pins 146 are projected.

The teeth of the output sun gear 132 are somewhat longer than required for engagement with the planet gears 122, and a ratchet toothed ring is provided concentrically surrounding the toothed portion 132, the ring being internally toothed to mesh with the gear teeth, so that the ring is keyed with respect to the output sun gear. A plurality of pawls 160 are pivoted to the casing wall portion 52 upon fulcrum pins 162 and normally urged into engagement with the teeth of the ratchet ring 161, as by leaf spring means comprising a sheet metal band 163 fitted inside the flange 50 and having a plurality of spring tongues 164, one of which bears inwardly against each pawl. The pawls 160 ratchet freely over the teeth of the ring 161 whenever the speed of the casing exceeds the speed of the output pulley. Of course the pawls also tend to fly outwardly under centrifugal force, and the spring tongues 164 are of light tension so that the pawls move outwardly at relatively low speeds, preferably below the engine idling speed. The pawls thus offer no interference with the driving of the rear wheels by the engine. When the parts are substantially at rest, however, the pawls move inwardly to engage the ratchet teeth 161, and the engine may then be cranked by turning the output pulley, which may be effected merely by actuating the foot pedals 14, or by pushing the cycle. It will be seen that this will rotate the sun gear portion 132 counterclockwise, as viewed in Fig. 3, to urge the pawls into engagement with the teeth and through the pawls turn the casing forwardly in the same direction to crank the engine through the connecting belt 28.

In the cylindrical wall portion 50 between the two pulleys, a removable screw plug 170 is provided through which lubricant can be inserted in the gear case portion. It will be appreciated that the level of the lubricant in the casing may easily be checked simply by turning the casing to a position where, with the plug removed, the oil just commences to flow out. Thus, for example, a suitable oil level would be maintained if the inner transmission casing portion were kept half full of oil, which would be the level at which oil would commence to run out with the plug located on a radial line parallel to the ground, while draining is easily effected merely by moving the plug opening to the bottom.

The operation of the transmission may be summarized as follows: With the engine running at idling speed, the flyweights 94 are maintained in indrawn position by the garter spring assembly 95. The casing assembly is rotated by the engine through the belt 28 but the friction clutch plate 86 is released and the pawls 160 are incapable of transmitting a drive in this direction as previously explained, so that no drive is transmitted to the rear wheel.

When the engine is accelerated to a predetermined desired starting speed, the flyweights 94 move radially outwardly and are cammed to the right, as viewed in Fig. 2, by the sloping wall 33 of the casing, to engage the clutch disk 86, thereby transmitting a forward drive to the hub 108, cage 116, and planet gear spindles 118. The planet gears 120 and 122 accordingly tend to roll forwardly upon both of the sun gears 130, 132. Since the load is applied to the sun gear 132 and such gear is larger than the sun gear 130, planet gears 122 being smaller than planet gears 120, a reverse torque reaction resulting from such load is imposed through the planet gears upon the sun gear 130, tending to rotate the latter sun gear and the rotor 128 which is unitary therewith in a reverse direction, or clockwise, as viewed in Fig. 5. Such reverse rotation of the rotor can only occur until the braking pawl pins 133 enter the notches 140. Thereafter reverse rotation of the rotor and sun gear 130 is arrested, planet gears 120 are forced to roll forwardly upon the stationary sun gear 130, and since no rearward slip can occur at this point, the points of tooth engagement of the smaller planet gears 122 with output sun gear 132 are carried forwardly at reduced velocity to impart a reduced speed, higher torque drive to the output sun gear and through hub 65 to the output pulley and belt 30 to the rear wheel.

Such reduced speed, torque-multiplying drive will continue, regardless of the speed of the cycle, so long as there is no interruption of the transmission of torque through the system. The low speed drive is a free-wheeling drive, however, since, if the throttle is closed or reduced while the cycle is traveling below the critical upshifting speed, the cage 116 will slow down and the rear wheels will tend, acting through the output sun gear 132, to turn the planet gears more rapidly than they are carried forward by the cage, thereby turning the planet gears on their pins in a direction to carry the sun gear 130 and rotor 128 forwardly or counterclockwise as viewed in Fig. 5, which is permitted by the ratcheting action of the pins 133.

If the throttle is momentarily closed after the cycle has attained a sufficient speed, the rotor 128 is spun forwardly in the manner just described rapidly enough so that the pins 146 fly outwardly, under the effect of centrifugal force, into the cutout portions 155 of the cage 116. This action is facilitated by the fact that the cage slows down as the rotor speeds up, so that the pins may fly out as the parts approach synchronism, and the pins can pick up the load smoothly. The pins may strike the end portions 156 of the openings 155 in the cage so that the vehicle tends to accelerate the engine, but when the throttle is again opened, the cage overtakes the pins 146, that is, the cage turns counterclockwise as viewed in Fig. 5, faster than the rotor until the end portions 157 of the openings 155 strike the pins 146. The engine thereafter turns the rotor forwardly at full speed, driving through both the connection furnished by the pins 146, the rotor 128 and sun gear 130, and also through the planet spindle pins 118 and planet gears 122, so that the planetary system is locked up and a direct drive is transmitted to the output sun gear 132.

The high speed or direct drive will be seen to provide engine braking while the cycle is traveling above the critical downshifting speed, since if the throttle is closed while traveling above such speed in direct drive, the rotor merely overtakes the cage by moving counterclockwise with respect thereto, as viewed in Fig. 5, until the pins 146 strike the opposite ends 156 of the cage openings 155, to transmit a direct drive to the engine. If the vehicle continues to decelerate under these conditions, however, the rear wheels continue to drive the engine forwardly as the speed falls away until a point is reached where the torque applied to the pins 146 from the rear wheel no longer exceeds that derived from the motor, so that no lateral cramping effort is then exerted upon the pins. This point is reached at a speed below the downshifting speed, so that at such time the springs 150 overcome centrifugal force, draw the pins 146 inwardly to the position shown in Fig. 5, and the unit free-wheels as the low gear drive is re-established.

It will be observed that the cycle may be made to free-wheel or coast at speeds above the upshifting speed, if desired, providing the coasting commences with the centrifugally-operated disk clutch released, that is, with the engine turning over at low speed and the flyweights 94 drawn in. If the throttle is allowed to remain closed under such conditions, the flyweights, rotating only at idling speed, remain in their indrawn positions and the coasting speed can increase to any value without causing an upshift. Thus, for example, if the rider has climbed a hill and reaches the top in low gear, traveling at a relatively low speed, he can close the throttle at the top of the hill, and allow the cycle to coast downhill with the engine idling. If at any time during his descent the rider wishes to avail himself of engine braking, he need only open the throttle to speed the engine up until the disk clutch is engaged and to bring the cage speed substantially up to the speed of the rotor, so that the centrifugal pins 146 can fly outwardly into the slots 155 to establish direct drive. Once direct drive is established in this manner, it cannot be disengaged until the vehicle slows down sufficiently to shift to the low gear.

In event it is necessary or desired to propel the cycle by means of the foot pedals, it is only necessary to remove the easily-removable belt 28.

In the assembly of the casing sections 32, 52, etc., by means of the screws 36, a desired degree of preloading is imposed upon the bearings 58, 112, 63 and 115. Preferably a gasket 39 is provided between the flat web portions 35, 38 of the casing sections, and it will be understood that by substituting a thinner gasket, bearing clearance can be taken up.

It will be observed that the hub flange portion 65 is long enough to provide substantial clearance between the outer end of the neck 54 and the pulley web portion 67. Such clearance, which is designated 199, facilitates disassembly of the transmission. During disassembly, after the casing sections are separated and the gearing, rotor, etc., are removed, the bearing balls 56 are removable by pushing the casing section 52 and bearing race 59 axially inwardly along the hub toward the pulley web 67 far enough to permit the balls 56 to be removed through the then-enlarged space between the belled mouth of the race ring 58 and the coacting race portion 60 of the hub.

It will be appreciated that the action of the pins 133 and slots 140 is that of an overrunning brake, and that if preferred, an overrunning clutch device of a more usual type could be substituted, such as a conventional wedging roller assembly.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What is claimed is:

1. An automatic transmission comprising a casing structure including a partition defining substantially concentric inner and outer chambers, automatic clutch means including a part drivably connected to said casing, clutch actuating means housed at least partly within one of said chambers, torque converting transmission mechanism housed at least partly within the other chamber but connected in a driving series with said automatic clutch means, a driving part and a drivable part, one such part being operatively connected to the casing and the other part to said mechanism, and means also housed at least partly within said other chamber and including a speed responsive member for varying the torque ratio of said mechanism.

2. An automatic transmission comprising a casing structure including a partition defining substantially concentric inner and outer chambers, automatic clutch means including a part drivably connected to said casing, clutch actuating means housed at least partly within one of said chambers, torque converting transmission mechanism housed at least partly within the other chamber but connected in a driving series with said automatic clutch means, means for connecting a driving element to the casing structure and a drivable element to said mechanism, and means also housed at least partly within said other chamber and including a speed responsive member for varying the torque ratio of said mechanism.

3. In an automatic transmission construction, a planetary system including a rotatable planet carrier, a planet gear cluster including planet gears of different diameters orbitally revoluble by the carrier, a driven sun gear meshing with one of the planet gears of said cluster, a reaction sun gear meshing with another planet gear of said cluster, a brake for preventing unwanted rotation of the reaction sun gear, and a centrifugal clutch element responsive to the rate of rotation of said reaction sun gear and operatively interengageable with said reaction sun gear and said planet carrier to lock said reaction sun gear and said planet carrier together and thereby to lock up said planetary system.

4. A transmission construction as defined in claim 3 including a fixed shaft rotatably supporting said carrier, said brake comprising a one-way reaction brake coacting with said shaft.

5. A transmission construction as defined in claim 3 including a rotor fast with respect to the reaction sun gear and interfitted at least partially with the carrier, said centrifugal clutch element being carried by the rotor and keyed with respect thereto and projectable into interlocked engagement with, and retractable from, the carrier.

6. A transmission construction as defined in claim 3 including a rotor fast with respect to the reaction sun gear and interfitted at least partially with the carrier, said centrifugal clutch element comprising a sprag mounted in the rotor and projectable in a generally radial direction to interengage the carrier and rotor.

7. A transmission construction as defined in claim 3 including a rotor fast with respect to the reaction sun gear and interfitted at least partially with the carrier, said centrifugal clutch element comprising a sprag mounted in the rotor and projectable in a generally radial direction to interengage the carrier and rotor, and said brake comprising a pawl member also carried by the rotor.

8. A transmission construction as defined in claim 3 including a rotor fast with respect to the reaction sun gear and interfitted at least partially with the carrier, said centrifugal clutch element comprising a sprag projectable in a radial direction to interengage the carrier and rotor, said brake comprising a pawl member also carried by the rotor, and a fixed shaft rotatably supporting the carrier and the rotor and both of said gun gears and coacting with said pawl.

9. In an automatic transmission construction, a planetary system including a rotable planet carrier, a planet gear cluster including planet gears of different diameters orbitally revoluble by the carrier, a driven sun gear meshing with one of the planet gears of said cluster, a reaction sun gear meshing with another planet gear of said cluster, a brake for preventing unwanted rotation of the reaction sun gear in one direction, a centrifugal clutch element responsive to the rate of rotation of said reaction sun gear in the opposite direction for locking up said planetary system, a fixedly positioned shaft rotatably supporting said carrier and sun gears, a casing portion concentrically supported by and rotatable with respect to said shaft and enclosing said sun gears, and also enclosing the planet gears and carrier, friction clutch means supported by said casing portion outside the same, including a driving clutch portion drivable by said casing, a driven clutch portion, and a connecting portion connecting said driven clutch portion to the carrier and extending rotatably through but substantially sealed with respect to said casing portion.

10. In an automatic transmission construction, a planetary system including a rotatable planet carrier, a planet gear cluster including planet gears of different diameters orbitally revoluble by the carrier, a driven sun gear meshing with one of the planet gears of said cluster, a reaction sun gear meshing with another planet gear of said cluster, a brake for preventing unwanted rotation of the reaction sun gear in one direction, a centrifugal clutch element responsive to the rate of rotation of said reaction sun gear in the opposite direction for locking up said planetary system, a fixedly positioned shaft rotatably supporting said carrier and sun gears, a casing structure including two integrated concentric but radially spaced walls concentrically supported by and rotatable with respect to said shaft, the inner wall enclosing said sun gears, and also enclosing said planet gears and carrier, friction clutch means supported by said casing structure outside the inner wall, including a driving clutch portion drivable by said casing structure, a driven clutch portion, and a connecting portion connecting said driven clutch portion to the carrier and extending rotatably through but substantially sealed with respect to said inner wall.

11. In an automatic transmission construction, a planetary system including a rotatable planet carrier, a planet gear cluster including planet gears of different diameters orbitally revoluble by the carrier, a driven sun gear meshing with one of the planet gears of said cluster, a reaction sun gear meshing with another planet gear of said cluster, a brake for preventing unwanted rotation of the reaction sun gear in one direction, a centrifugal clutch element responsive to the rate of rotation of said reaction sun gear in the opposite direction for locking up said planetary system, a fixedly positioned shaft rotatably supporting said carrier and sun gears, a casing structure including two integrated concentric but radially spaced walls concentrically supported by and rotatable with respect to said shaft, the inner wall enclosing said sun gears, and also enclosing said planet gears and carrier, friction clutch means supported by said casing structure outside the inner wall, including a driving clutch portion drivable by said casing, a driven clutch portion, and a connecting portion connecting said driven clutch portion to the carrier and extending rotatably through but substantially sealed with respect to said inner wall, said connecting portion comprising a hub journaled on the shaft and rotatably supporting said inner wall and projecting through and from an open end of said inner wall for connection to said driven clutch portion, the carrier being fast to the hub within the inner wall.

12. In an automatic transmission construction, a planetary system including a rotatable planet carrier, a planet gear cluster including planet gears of different diameters orbitally revoluble by the carrier, a driven sun gear meshing with one of the planet gears of said cluster, a reaction sun gear meshing with another planet gear of said cluster, a brake for preventing unwanted rotation of the reaction sun gear in one direction, a centrifugal clutch element responsive to the rate of rotation of said reaction sun gear in the opposite direction for locking up said planetary system, a fixedly positioned shaft rotatably supporting said carrier and sun gears, a casing structure including two integrated concentric but radially spaced walls concentrically supported by and rotatable with respect to said shaft, the inner wall enclosing said sun gears, and also enclosing said planet gears and carrier, friction clutch means supported by said casing structure outside the inner wall, including a driving clutch portion drivable by said casing, a driven clutch portion, a connecting portion connecting said driven clutch portion to the carrier and extending rotatably through but substantially sealed with respect to said inner wall, and actuating flyweights for said friction clutch means housed between said inner and outer walls.

13. In an automatic transmission construction, a planetary system including a rotatable planet carrier, a planet gear cluster including planet gears of different diameters orbitally revoluble by the carrier, a driven sun gear meshing with one of the planet gears of said cluster, a reaction sun gear meshing with another planet gear of said cluster, a brake for preventing unwanted rotation of the reaction sun gear in one direction, a centrifugal clutch element responsive to the rate of rotation of said reaction sun gear in the opposite direction for locking up said planetary system, a fixedly positioned shaft rotatably supporting said carrier and sun gears, a casing structure including two integrated concentric but radially spaced walls concentrically supported by and rotatable with respect to said shaft, the inner wall enclosing said sun gears, and also enclosing said planet gears and carrier, friction clutch means supported by said casing structure outside the inner wall, including a driving clutch portion drivable by said casing, a driven clutch portion, a connecting portion connecting said driven clutch portion to the carrier and extending rotatably through but substantially sealed with respect to said inner wall, and actuating flyweights for said friction clutch means housed between said inner and outer walls, said casing structure including a web wall integral with and joining said inner and outer walls near one end and of generally truncated conic form and defining at least a part of a pulley groove, said flyweights having follower portions engageable with the inside of the web wall.

14. In an automatic transmission construction, a planetary system including a rotatable planet carrier, a planet gear cluster including planet gears of different diameters orbitally revoluble by the carrier, a driven sun gear meshing with one of the planet gears of said cluster, a reaction sun gear meshing with another planet gear of said cluster, a brake for preventing unwanted rotation of the reaction sun gear in one direction, a centrifugal clutch element responsive to the rate of rotation of said reaction sun gear in the opposite direction for locking up said planetary system, a fixedly positioned shaft rotatably supporting said carrier and sun gears, a casing structure including two integrated concentric but radially spaced walls concentrically supported by and rotatable with respect to said shaft, the inner wall enclosing said sun gears, and also enclosing said planet gears and carrier, friction clutch means supported by said casing structure outside the inner wall, including a driving clutch portion drivable by said casing, a driven clutch portion, a connecting portion connecting said driven clutch portion to the carrier and extending rotatably through but substantially sealed with respect to said inner wall, actuating flyweights for said friction clutch means housed between said inner and outer walls, said casing structure including a web wall integral with and joining said inner and outer walls near one end and of generally truncated conic form and defining at least a part of a pulley groove, said flyweights having follower portions engageable with the inside of the web wall, and a clutch pressure plate engageable by the flyweights and sustantially bridging the space between the opposite ends of said inner and outer walls.

15. In an automatic transmission construction, a planetary system including a rotatable planet carrier, a planet gear cluster including planet gears of different diameters orbitally revoluble by the carrier, a driven sun gear meshing with one of the planet gears of said cluster, a reaction sun gear meshing with another planet gear of said cluster, a brake for preventing unwanted rotation of the reaction sun gear in one direction, a centrifugal clutch element responsive to the rate of rotation of said reaction sun gear in the opposite direction for locking up said planetary system, a fixedly positioned shaft rotatably supporting said carrier and sun gears, a casing structure including two integrated concentric but radially spaced walls concentrically supported by and rotatable with respect to said shaft, the inner wall enclosing said sun gears, and also enclosing said planet gears and carrier, friction clutch means supported by said casing structure outside the inner wall, including a driving clutch portion drivable by said casing, a driven clutch portion, a connecting portion connecting said driven clutch portion to the carrier and extending rotatably through but substantially sealed with respect to said inner wall, actuating flyweights for said friction clutch means housed between said inner and outer walls, said casing structure including a web wall integral with and joining said inner and outer walls near one end, and a cover extending across the other end of the outer wall and forming a reaction member for said friction clutch.

16. In an automatic transmission construction, a planetary system including a rotatable planet carrier, a planet gear cluster including planet gears of different diameters orbitally revoluble by the carrier, a driven sun gear meshing with one of the planet gears of said cluster, a reaction sun gear meshing with another planet gear of said cluster, a brake for preventing unwanted rotation of the reaction sun gear in one direction, a centrifugal clutch element responsive to the rate of rotation of said reaction sun gear in the opposite direction for locking up said planetary system, a fixedly positioned shaft rotatably supporting said carrier and sun gears, a casing structure including two integrated concentric but radially spaced walls concentrically supported by and rotatable with respect to said shaft, the inner wall enclosing said sun gears, and also enclosing said planet gears and carrier, friction clutch means supported by said casing structure outside the inner wall, including a driving clutch portion drivable by said casing, a driven clutch portion, a connecting portion connecting said driven clutch portion to the carrier and extending rotatably through but substantially sealed with respect to said inner wall, actuating flyweights for said friction clutch means housed between said inner and outer walls, said casing structure including a web wall integral with and joining said inner and outer walls near one end and of generally truncated conic form and defining at least a part of a pulley groove, said flyweights having follower portions engageable with the inside of the web wall, and a cover extending across the other end of the outer wall and forming a reaction member for said friction clutch.

17. In an automatic transmission construction, a planetary system including a rotatable planet carrier, a planet gear cluster including planet gears of different diameters orbitally revoluble by the carrier, a driven sun gear meshing with one of the planet gears of said cluster, a reaction sun gear meshing with another planet gear of said cluster, a brake for preventing unwanted rotation of the reaction sun gear in one direction, a centrifugal clutch element responsive to the rate of rotation of said reaction sun gear in the opposite direction for locking up said planetary system, a fixedly positioned shaft rotatably supporting said carrier and sun gears, a casing structure including two integrated concentric but radially spaced walls concentrically supported by and rotatable with respect to said shaft, the inner wall enclosing said sun gears, and also enclosing said planet gears and carrier, friction clutch means supported by said casing structure outside the inner wall, including a driving clutch portion drivable by said casing, a driven clutch portion, a connecting portion connecting said driven clutch portion to the carrier and extending rotatably through but substantially sealed with respect to said inner wall, actuating flyweights for said friction clutch means housed between said inner and outer walls, said casing structure including a web wall integral with and joining said inner and outer walls near one end and of generally truncated conic form and defining at least a part of a pulley groove, said flyweights having follower portions engageable with the inside of the web wall, a clutch pressure plate engageable by the flyweights and substantially bridging the space between the opposite ends of said inner and outer walls, and a cover extending across the other end of the outer wall and forming a reaction member for said friction clutch, said driven clutch portion comprising a clutch plate arranged to be gripped between said pressure plate and cover.

18. An automatic transmission comprising a casing structure including a partition defining substantially concentric inner and outer chambers, automatic clutch means housed at least partly within the outer chamber, means for driving the casing, means including a clutch actuating element responsive to rotation of the casing for actuating the clutch means, an axial support, a driven output element carried by the support, torque converting transmission mechanism housed at least partly within the inner chamber and connected to said automatic clutch means and to said output element to provide a variable ratio drive therebetween, said transmission mechanism including a shiftable element operably connected to, and operable in response to variances of speed of said driven output element to change the torque converting effect of said transmission mechanism.

19. Means as defined in claim 18 wherein said casing structure comprises a pair of substantially concentric cylindrical walls, the outer of which is of greater axial length than the inner, said clutch actuating element including a flyweight housed between said walls, said clutch means including a clutch plate housed within the outer of said walls but overlying the end of said shorter inner wall, and a hub portion rotatably supporting said inner wall and keyed to said clutch plate at its outer extremity and operatively connected at its inner extremity to said transmission mechanism within the inner wall.

20. Means as defined in claim 18 wherein said casing structure comprises a pair of substantially concentric cylindrical walls, the outer of which is of greater axial length than the inner, said clutch actuating element including a flyweight housed between said walls, said clutch means including a clutch plate housed within the outer of said walls but overlying the end of said shorter inner wall, and a hub portion rotatably supporting said inner wall and keyed to said clutch plate at its outer extremity and operatively connected at its inner extremity to said transmission mechanism within the inner wall, said transmission mechanism including a planetary gearset having a planet gear carrier connected to the hub.

21. In a transmission construction as defined in claim 3, a fixedly positioned shaft rotatably supporting said carrier and said sun gears, a rotor fast with respect to the reaction sun gear and interfitted at least partially with the carrier, said brake comprising a pawl element carried by the rotor, and a ratchet tooth portion on the shaft with which the pawl element is engageable.

22. In a transmission construction as defined in claim 3, a fixedly positioned shaft rotatably supporting said carrier and said sun gears, a rotor fast with respect to the reaction sun gear and interfitted at least partially with the carrier, said brake comprising a pawl element carried by the rotor, a ratchet tooth on the shaft with which said pawl is engageable, said centrifugal clutch element comprising a sprag also carried by the rotor and projectable to engage the carrier, and a spring yieldably opposing such projection of the sprag into engagement with the carrier.

23. In a transmission construction as defined in claim 3, a fixedly positioned shaft rotatably supporting said carrier and said sun gears, a rotor fast with respect to the reaction sun gear and interfitted at least partially with the carrier, said brake comprising a pawl element carried by the rotor, a ratchet tooth on the shaft with which said pawl is engageable, said centrifugal clutch element comprising a sprag also carried by the rotor and projectable to engage the carrier, and a spring yieldably opposing such projection of the sprag into engagement with the carrier, said carrier having a pair of abutment portions engageable by the sprag when the latter is projected, said abutment portions being spaced from one another an angular distance substantially exceeding the circumferential length of the sprag.

24. An automatic transmission comprising a casing structure including a partition defining substantially concentric inner and outer chambers, torque converting transmission mechanism housed at least partially within the inner chamber, means for connecting a driving element to the casing structure and for connecting a drivable element to said mechanism, main clutch means carried by said housing structure outside of said inner chamber, actuating means for said main clutch means operable in response to the speed of said housing structure, a transmission input element located at one end of the casing structure and projecting both into and out of, but substantially sealed with respect to, said inner chamber, for connecting the main clutch means to the transmission mechanism, said means for connecting the drivable element to said transmission mechanism including a transmission output element rotatably extending through the other end of said casing structure and also substantially sealed with respect to said inner chamber.

25. An automatic transmission comprising a casing structure including a partition defining substantially concentric inner and outer chambers, torque converting transmission mechanism housed at least partially within the inner chamber, means for connecting a driving element to the casing structure and for connetcing a drivable element to said mechanism, main clutch means carried by said housing structure outside of said inner chamber, a transmission input element located at one end of the casing structure and projecting both into and out of, but substantially sealed with respect to, said inner chamber, for connecting the main clutch means to the transmission mechanism, said means for connecting the drivable element to said transmission mechanism including a transmission output element rotatably extending through the other end of said casing structure and also substantially sealed with respect to said inner chamber, said torque converting transmission mechanism including a planetary gearset incorporating a carrier connected to said transmission input element and a sun gear connected to said transmission output element.

26. An automatic transmission comprising a casing structure including a partition defining substantially concentric inner and outer chambers, torque converting transmission mechanism housed at least partially within the inner chamber, means for connecting a driving element to the casing structure and for connecting a drivable element to said mechanism, main clutch means carried by said housing structure outside of said inner chamber, a transmission input element located at one end of the casing structure and projecting both into and out of, but substantially sealed with respect to, said inner chamber, for connecting the main clutch means to the transmission mechanism, said means for connecting the drivable element to said transmission mechanism including a transmission output element rotatably extending through the other end of said casing structure and also substantially sealed with respect to said inner chamber, a centrifugally releasable clutch element normally providing direct driving engagement between the transmission output element and said casing structure, a spring yieldably urging said clutch element to engaged position, said clutch element being movable to disengaged position against the effort of such spring in response to rotation of the casing structure.

27. An automatic transmission comprising a casing structure including a partition defining substantially concentric inner and outer chambers, torque converting transmission mechanism housed at least partially within the inner chamber, means for connecting a driving element to the casing structure and for connecting a drivable element to said mechanism, main clutch means carried by said housing structure outside of said inner chamber, a transmission input element located at one end of the casing structure and projecting both into and out of, but substantially sealed with respect to, said inner chamber, for connecting the main clutch means to the transmission mechanism, said means for connecting the drivable element to said transmission mechanism including a transmission output element rotatably extending through the other end of said casing structure and also substantially sealed with respect to said inner chamber, a centrifugally releasable clutch element normally providing direct driving engagement between said transmission output element and the casing structure, a spring yieldably urging said clutch element to said engaged position, said clutch element being movable to disengaged position against the effort of such spring in response to rotation of the casing structure, said centrifugally operable clutch element comprising a pawl effective to transmit a drive only in a forward direction from the casing structure to the transmission output element.

28. A casing structure for a transmission of the character described comprising a pair of opposed complementary concave sheet metal housing portions having their concave ends abutting and secured together, outturned abutting flanges forming at least a part of the means for securing said housing portions together, said flanges comprising generally parallel securing sections adapted to be fastened together, outwardly divergent portions of generally truncated conic form defining a pulley groove, one of said housing portions incorporating an integral cylindrical wall radially outspaced from and concentric with the first-mentioned cylindrical wall and constituting an axial extension of the truncated conic flange portion, whereby said one housing portion has an inner concave chamber facing said other housing portion and an outer annular concave chamber facing in the opposite direction.

29. In an automatic transmission construction, a planetary system including a rotatable planet carrier, a planet gear cluster including planet gears of different diameters orbitally revoluble by the carrier, a driven sun gear meshing with the one of the planet gears of said cluster, a reaction sun gear meshing with another planet gear of said cluster, a brake for preventing unwanted rotation of the reaction sun gear in one direction, a centrifugal clutch element responsive to the rate of rotation of said reaction sun gear in the opposite direction for locking up said planetary system, means for driving the carrier from one end, the planet gears of greater diameter being nearer said end of the carrier, a rotor portion interfitted with the carrier and connected to the reaction sun gear, the driven sun gear being nearer the opposite end of the carrier and meshing with the smaller planet gears, and the centrigugal clutch element being carried by the rotor and operatively interengageable with the carrier.

LAWRENCE A. SCHOTT.

REFERENCES CITED

The following references are of record in the file of this patent:

UNITED STATES PATENTS

| Number | Name | Date |
|---|---|---|
| 572,828 | Redding | Dec. 8, 1896 |
| 917,729 | Henroid | Apr. 6, 1909 |
| 978,880 | Harley | Dec. 20, 1910 |
| 1,032,524 | Wiard | July 16, 1912 |
| 1,091,606 | Vodoz | Mar. 31, 1914 |
| 1,102,603 | Morgan | July 7, 1914 |
| 1,170,980 | Levedahl | Feb. 8, 1916 |
| 1,612,169 | Bingham | Dec. 28, 1926 |
| 1,727,603 | Johnson | Sept. 10, 1929 |
| 1,845,631 | Seebach | Feb. 16, 1932 |
| 1,937,503 | Banker | Dec. 5, 1933 |
| 2,071,428 | Prince | Feb. 23, 1937 |
| 2,179,933 | Heyer | Nov. 14, 1939 |
| 2,180,217 | Thomas | Nov. 14, 1939 |
| 2,218,813 | Cotterman | Oct. 22, 1940 |
| 2,259,731 | Burtnett | Oct. 21, 1941 |
| 2,366,841 | Dodge | Jan. 9, 1945 |
| 2,429,153 | Ammon | Oct. 14, 1947 |
| 2,460,539 | Shank | Feb. 1, 1949 |
| 2,467,627 | Olson | Apr. 19, 1949 |
| 2,496,937 | Edwards | Feb. 7, 1950 |

FOREIGN PATENTS

| Number | Country | Date |
|---|---|---|
| 48,510 | France | Mar. 8, 1938 |
| 370,830 | Great Britain | Apr. 14, 1932 |
| 441,519 | France | May. 29, 1912 |